LE VERT CLARK.
VEHICLE WHEEL DESIGNATED AS DOUBLE SAFETY BOLSTER WHEEL.
APPLICATION FILED MAY 15, 1907.

919,825.

Patented Apr. 27, 1909.
2 SHEETS—SHEET 1.

WITNESSES
C. E. Day.
C. F. Burton.

INVENTOR
Le Vert Clark

LE VERT CLARK.
VEHICLE WHEEL DESIGNATED AS DOUBLE SAFETY BOLSTER WHEEL.
APPLICATION FILED MAY 15, 1907.

919,825.

Patented Apr. 27, 1909.
2 SHEETS—SHEET 2.

WITNESSES
C. E. Day
C. F. Burton

INVENTOR
LeVert Clark

UNITED STATES PATENT OFFICE.

LE VERT CLARK, OF DETROIT, MICHIGAN.

VEHICLE-WHEEL DESIGNATED AS DOUBLE SAFETY BOLSTER-WHEEL.

No. 919,825.     Specification of Letters Patent.     Patented April 27, 1909.

Application filed May 15, 1907. Serial No. 373,780.

*To all whom it may concern:*

Be it known that I, LE VERT CLARK, a citizen of the United States, residing at Detroit, county of Wayne, State of Michigan, have invented a certain new and useful Improvement in Vehicle-Wheels Designated as Double Safety Bolster-Wheels, and declare the following to be a full, clear, and exact description of the same, such as will enable others skilled in the art to which it pertains to make and use the same, reference being had to the accompanying drawings, which form a part of this specification.

This invention relates to vehicle wheels; I designate it as a double safety bolster wheel.

It has for its object an improved resilient or elastic vehicle wheel in which provision is made for an elastic yielding element between almost the entire axle and an outer member substantially concentric therewith. This outer member sometimes supports tires, as when the wheel is used for railroad vehicles, in other forms it supports spokes, or hubs and spokes, as when the wheel is used for road vehicles.

Figure 1:
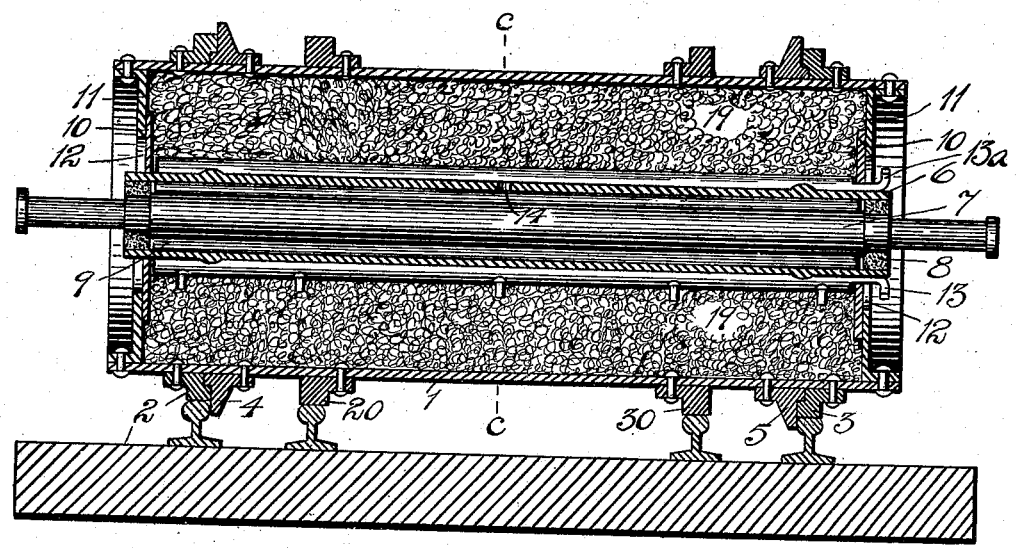
Figure 2:
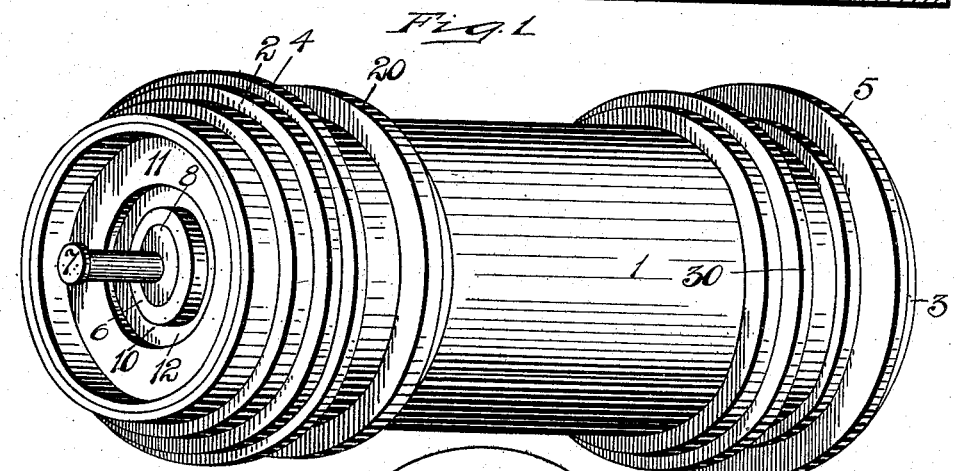
Figure 3:
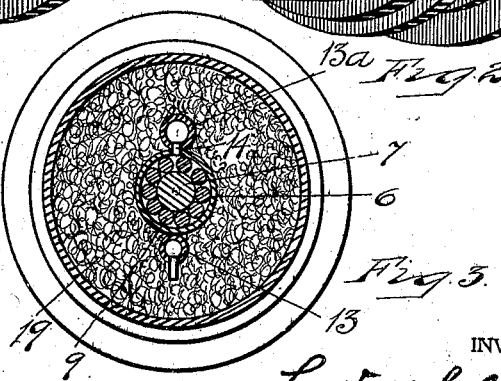
Figure 4:
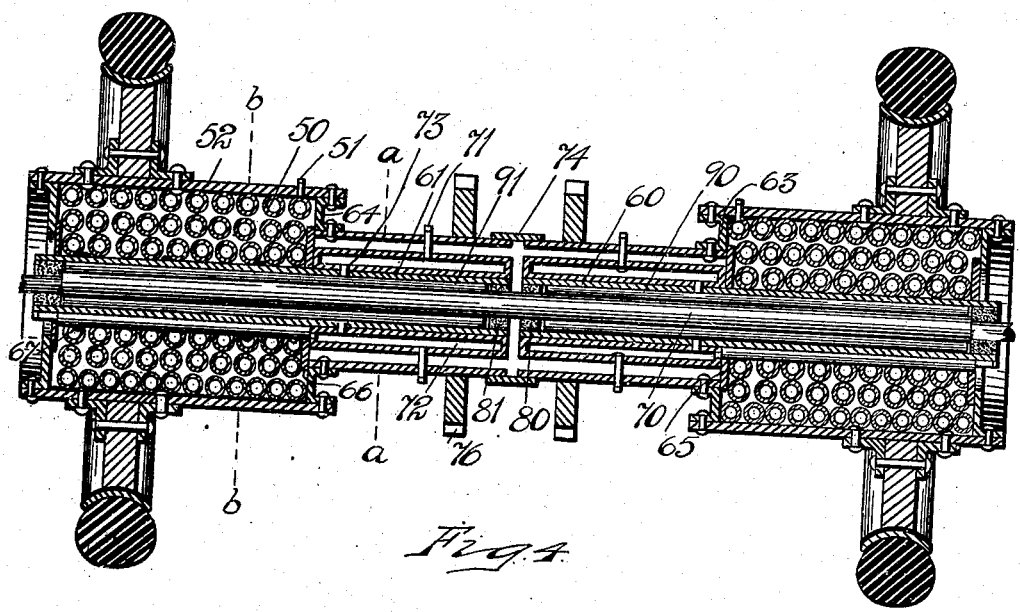
Figure 5:
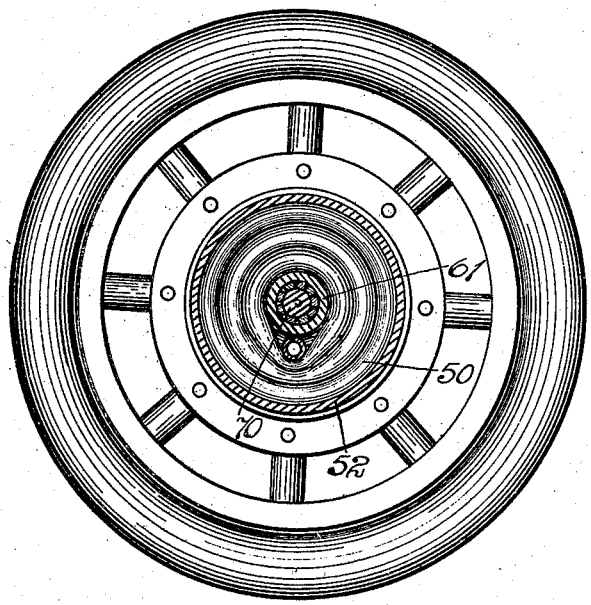
Figure 6:
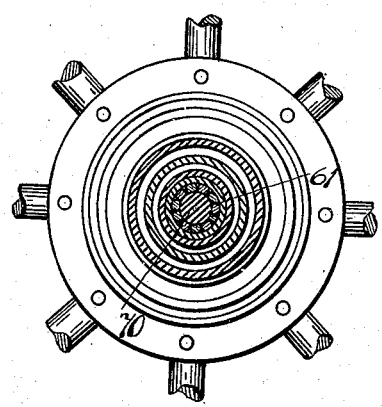

In the drawings:—Figure 1, is a section longitudinal of the axle of the double wheel embodying this invention. Fig. 2, is a perspective of the wheel shown in Fig. 1. Fig. 3, is a cross section at the line *c—c* of Fig. 1. Fig. 4, is a section longitudinal of the axle of a wheel made in two parts and having a reduced or "waist" portion on each at their adjacent ends. Fig. 5, is a cross section substantially along the line *b—b* of Fig. 4. Fig. 6, is a cross section at the line *a—a* of Fig. 4.

In its essentials the wheel consists of an external drum-like member which may be considered as a felly member, or as a hub member. It may be considered as a felly member when as in Fig. 1, the tire engages directly on this member, and as a hub member when as in Fig. 4, the tire or felly proper is supported from this member on intervening spokes. This member is cylindrical and has concentric with it a cylindrical shaft or axle bearing tube within which is contained an axle or shaft; the axle containing tube is held in place within the drum member by a stuffing of an elastic, but somewhat yielding material, the yielding qualities being, however, slight, and the elasticity the greatest possible comparable with the character of the material employed and the service in which the double wheel is to be used.

Referring to Fig. 1, 1 indicates the drum or barrel upon which may be secured at proper locations tires 2, or a plurality of tires 2 and 3, 20 and 30; guard rims 4 and 5, are also employed, and furnish flanges for the tires 2 and 3. An axle bearing tube 6 is located concentric with the barrel 1. The axle bearing tube 6 contains within it and concentric with it the axle or shaft 7, the ends of which pass through suitable stuffing boxes 8 and the axle itself is preferably spaced from the bearing tube by roller bearings 9. The bearing tube 6 is held in place by a mass of stuffing 19, interposed between the drum 1 and the tube 6. The stuffing is of any material or combinations of materials, that when tightly packed suffices to hold the tube substantially in place, but is nevertheless so elastic and resilient that even though very tightly packed it will yield somewhat and will not transmit to the axle in their entirety, shocks affecting the drum, hub or the tires, and which if transmitted to the frame would affect the frame, that is, the packing material 19 cushions the entire axle and the frame which the axle supports. The axle tube 6 is provided with retaining washers 10 which engage frictionally against the end closure 11 of the drum. These washers fit snugly around the axle tube 6, but are not secured thereto, permitting the tube to slide imperceptibly back and forth through the washers. Space is left at the center of the end closure 11 for free oscillation of the axle tube within the limits of its movement as confined by the packing, and a space 12 in the end closure, which permits this free movement is covered by the washer 10. It is not intended that the movement shall be great. The packing is so strongly stuffed in the bolster chamber between the outer drum and the tube, that the movement of the latter with respect to the former is nearly imperceptible, but sufficient to absorb jars and vibration, making the double wheel elastic radially and laterally. Preferably, through the space 12, project the ends of the small tube 13, embedded in the porous stuffing material and employed for the purpose of introducing into the packing material a liquid filler, to be used only if in the course of time certain kinds of packing material becomes so compressed and hardened that it needs to be swelled or expanded by cellular absorption, that is, enlivened and revivified by saturating it somewhat with a liquid. The tube 13ª, may be used as an oil conduit or reservoir to admit oil from the outside of the drum through connecting oil pipes 14, to the interior of the bearing tube 6, for the purposes of lubricating the roller bearing. Any sort of railroad tire or a wagon hub with spokes and tire for road vehicles may be secured on the outer drum member, as for example, the tire shown in the drawing, Fig. 1, which is suitable for railroad work, and if desired, a plurality of such tires may be secured on the outer drum member and the wheel can then be used with a double track which will avoid the notches and irregularities in the track rails. In actual service the tires 20, 30, will run upon what I designate as boosting rails laid opposite railway frogs, crossings and rail joints, and if derailed the tires 20, 30, will themselves act as safety flanges against the rails in the track to prevent the wheel from leaving the track. The tires 20, 30, furnish additional surface as *loci* for application of additional brake shoes on the same brake beam with the other brake-shoes, which latter may even be dispensed with without detriment.

The form shown in Fig. 4, is the preferable form of double wheel and the drum is reduced to a smaller diameter at the middle or part which I have designated as the waist of the double wheel. The waist, the axle bearings, tube and bearings inside may also be divided near the middle, making the two end wheel portions turn independently on the single axle 70. The end of the bearings portion 90 is in the tube portion 60, and the other end of the bearings portion 91 is in the tube portion 61. At the adjacent ends of the tube portion 60 and 61, the single axle 70 passes through a stuffing box 80 in the tube portion 60, and 81 in the tube portion 61. The adjacent ends of the two end portions of the double wheel drum have two closure plates 63, 64, firmly secured at their perimeters to the drum, and nearer their centers, to the waist. Two restraining washers 65, 66, fit snugly around the axle bearing tube and are adapted to slide frictionally over the inner faces of the two end closures with every oscillation of the tube. The axle tube has slight corrugations, lugs or fixed collars 67, to engage with the stuffing inside the drum, but has a slight elastic thrust because none of the washers are necessarily fixed stationary to said tube. Inside the waist may be put a hollow cylindrical collar 72, encircling the tube to be used as an oil reservoir with inlet oil plug 71, and connected to the oil pipe extending therefrom to the outside drum head, and into the tube through a feed pipe 73, by which to lubricate the bearings. At the division between the waist section is a dust guard 74. The waist outside is used as a *locus* of the driving wheel 76, also for friction clutches, differentials, and other driving, steering, stopping and regulating devices, controlling the locomotion of said double wheel. The drum and the outer inclosures or drumheads may also be used as *loci* for similar devices as far as may be.

In the double wheel shown in Figs. 4 and 5, the packing employed is a coil of inflatable rubber tubing 50, inflated through a nipple 51, that extends through the outer casing 52.

While I have indicated in Figs. 1 and 3, stuffing or packing of fibrous material, and in Figs. 4 and 5, a filling or stuffing of inflatable tubing, I do not wish to limit myself to either, as the double wheel of my invention may be made elastic by any suitable filling means interposed between the outer member and the inner member.

While I have indicated the use of railroad flanged tires in Fig. 1, and hubs and spokes in Fig. 4, yet I wish it to be understood that railroad tires can also be used in Fig. 4, instead of hubs, spokes and tires when the double wheel is to run on a track.

What I claim is:—

1. A vehicle wheel, having in combination a drum, a tire supported thereby, a tube centrally located with respect thereto, bearings within said central tube for a shaft or axle, an elastic packing interposed between the central axle tube and the drum, substantially as described.

2. In a vehicle wheel, in combination with an external drum, a shaft bearing tube centrally disposed with respect thereto, a shaft rotatably mounted in said shaft bearing tube, an elastic packing interposed between the drum and the tube, heads to said drum having central openings therethrough, washer plates around the bearing tube adapted to engage against said heads and to slide thereon within the limits of motion allowed by the elastic packing in an elastic way, substantially as described.

3. In a vehicle wheel, in combination with concentrically disposed tubular members adapted to have relative movement lengthwise of the axis thereof, an elastic packing interposed between said tubular members, whereby relative movement of one of said members transversely of the axis is permitted, an axle engaging within the inner member, and a tire supported by the outer member, substantially as described.

4. In a vehicle wheel, in combination with a drum constituting the felly member of said wheel, a tire supported thereby, a tube constituting the inner hub member of said wheel, an elastic packing interposed between said members, substantially as described.

5. In a vehicle wheel, in combination with a drum constituting the felly or outer member, a tube constituting the inner member wherein an axle may engage, an elastic packing interposed between said members said packing constituting the only spacing means between said members and a tire, or tires external to the drum or felly member, substantially as described.

6. In a vehicle wheel, in combination with a drum constituting the felly member, a tube constituting the hub member, an elastic packing interposed between said members, and a tire secured to the felly member, and a plurality of tires supported by the felly member, substantially as described.

7. In a vehicle wheel, in combination with a drum constituting the outer member, a bearing tube constituting the inner member, elastic stuffing interposed between said members, pipes for feeding fluid into said stuffing, heads forming part of the outer drum member and power applying members secured to the head members, substantially as described.

8. In combination with a pair of drum members, tires supported by each drum member a pair of axle bearing members, elastic packing interposed between each drum and its axle bearing member, a tire secured to each drum member, a single axle for the pair of drum members, each drum member being provided with a section of reduced diameter, and the sections of reduced diameter of the two drum members being arranged adjacent to each other, substantially as described.

9. In a vehicle wheel, in combination with a pair of drum members each provided with a portion of large diameter, and a portion of small diameter, tires supported by each large drum member a pair of axle bearing members rotatable independently of said drum members, elastic packing interposed between each drum member and its axle bearing member, a single axle for the pair of drum members, a receptacle for lubricating material in each drum member, and communication through the axle bearing member for lubricating purposes, substantially as described.

In testimony whereof, I sign this specification in the presence of two witnesses.

LE VERT CLARK.

Witnesses:
CHARLES T. BURTON,
MAY E. KOTT.